United States Patent
Hanson et al.

(10) Patent No.: US 8,200,673 B2
(45) Date of Patent: Jun. 12, 2012

(54) SYSTEM AND METHOD FOR ON-DEMAND INDEXING

(75) Inventors: Mark E. Hanson, Los Angeles, CA (US); Richard T. Endo, Los Angeles, CA (US); Simon D. Shpilfoygel, Los Angeles, CA (US); Emil Antonov, Valencia, CA (US); Xidong Zheng, Los Angeles, CA (US); Hayim Hendeles, Los Angeles, CA (US); David E. Brookler, Los Angeles, CA (US)

(73) Assignee: SAP AG, Walldorf (DE)

( * ) Notice: Subject to any disclaimer, the term of this patent is extended or adjusted under 35 U.S.C. 154(b) by 329 days.

(21) Appl. No.: 12/494,120

(22) Filed: Jun. 29, 2009

(65) Prior Publication Data

US 2010/0332501 A1    Dec. 30, 2010

(51) Int. Cl.
*G06F 7/00*      (2006.01)
*G06F 17/00*     (2006.01)
*G06F 17/30*     (2006.01)
*G06F 15/16*     (2006.01)

(52) U.S. Cl. ........................... 707/741; 707/696

(58) Field of Classification Search .................. 707/741, 707/696
See application file for complete search history.

(56) References Cited

U.S. PATENT DOCUMENTS

| 5,504,894 | A  | * | 4/1996  | Ferguson et al. | 707/2   |
|-----------|----|---|---------|-----------------|---------|
| 6,879,976 | B1 |   | 4/2005  | Brookler et al. |         |
| 7,873,630 | B2 | * | 1/2011  | Arrouye et al.  | 707/715 |
| 2002/0120617 | A1 | * | 8/2002 | Yoshiyama et al. | 707/3 |
| 2003/0033278 | A1 | * | 2/2003 | Abe et al.      | 707/1   |
| 2008/0177994 | A1 | * | 7/2008 | Mayer           | 707/4   |
| 2008/0243788 | A1 | * | 10/2008 | Reztlaff et al. | 707/3  |
| 2009/0094186 | A1 | * | 4/2009 | Kan             | 707/1   |

* cited by examiner

*Primary Examiner* — Greta Robinson
*Assistant Examiner* — Brian E. Weinrich
(74) *Attorney, Agent, or Firm* — Buckley, Maschoff & Talwalkar LLC (57) ABSTRACT

A system and method for on-demand indexing in a data management system is described. An index is generated when it is requested, such as when a database operation requires access to the index. If the index is loaded in memory, the index is retrieved from memory. Otherwise, the index is generated on-demand. A priority configuration identifies at least one priority index which is generated and loaded in memory. The priority configuration can identify priority indexes either directly or indirectly, such as by a threshold parameter.

10 Claims, 5 Drawing Sheets

SYSTEM AND METHOD FOR ON-DEMAND INDEXING

BACKGROUND OF THE INVENTION

1. Field of the Invention

Embodiments of the invention described herein pertain to the field of computer systems. More particularly, but not by way of limitation, one or more embodiments of the invention relate to on-demand indexing in a data management system.

2. Description of the Related Art

Master data systems simplify maintenance and promote data integrity by simplifying the user's view of the data and its repository. For example, SAP's Master Data Management Environment (MDME) system is an integrated system for master data management that uses a SQL (Structured Query Language) DBMS, but does not require designers to use SQL for searching, sorting, and retrieving of information. A standard SQL DBMS does not support the types of advanced structures necessary for managing databases of master data. Generally speaking master data systems consist of a thick shell of functionality on top of a SQL-based DBMS to provide a scalable database where data is fully accessible to other SQL-based applications and tools.

A database index can improve the speed of database operations on a table, such as record access and search. Database indexes can be used to increase the efficiency of a master data system. Database systems require many indexes in order to efficiently search, but often many of the indexes which are calculated and loaded into memory are not utilized. Database indexes typically require less disk space than the indexed data, but become larger as the number of records is increased. Furthermore, as the number of records is increased, building indexes becomes computationally intensive and thus, the system is slowed down during load time.

There are currently no known systems that provide on demand indexing that initially loads a subset of indexes and calculates other indexes when a task is initiated that requires those indexes.

For at least the limitations described above there is a need for a system that initially loads a subset of indexes and calculates other indexes when a task is initiated that requires those indexes.

BRIEF SUMMARY OF THE INVENTION

One or more embodiments of the invention enable a system and method for on-demand indexing in a data management system. Various aspects of the invention are based on the insight that many of the indexes which are calculated and loaded into memory are not utilized.

One or more embodiments of the invention are directed toward a system and method of on-demand generation of an index. In on-demand generation, an index is generated when it is requested, such as when a database operation requires access to the index. A request for an index is received. If the index is loaded in memory, the index is retrieved from memory. Otherwise, the index is generated on-demand. One or more embodiments of the invention are directed toward a method that selectively generates and loads some indexes and generates other indexes on-demand.

One or more embodiments of the invention utilize a priority configuration identifying at least one priority index which is generated and loaded in memory. The priority configuration identifies priority indexes either directly or indirectly, such as by threshold parameters. An index that meets a threshold indicated by at least one threshold parameter is generated and loaded in memory. One or more embodiments of the invention utilize threshold parameters indicating a frequency of index usage.

One or more embodiments of the invention are directed toward a system and method of maintaining priority indexes stored in memory. Changes to database records related to a priority index are stored in an associated $\Delta$ index. An updated priority index is calculated using the $\Delta$ index when the priority index is requested.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A method and system for on-demand indexing will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features or functions well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
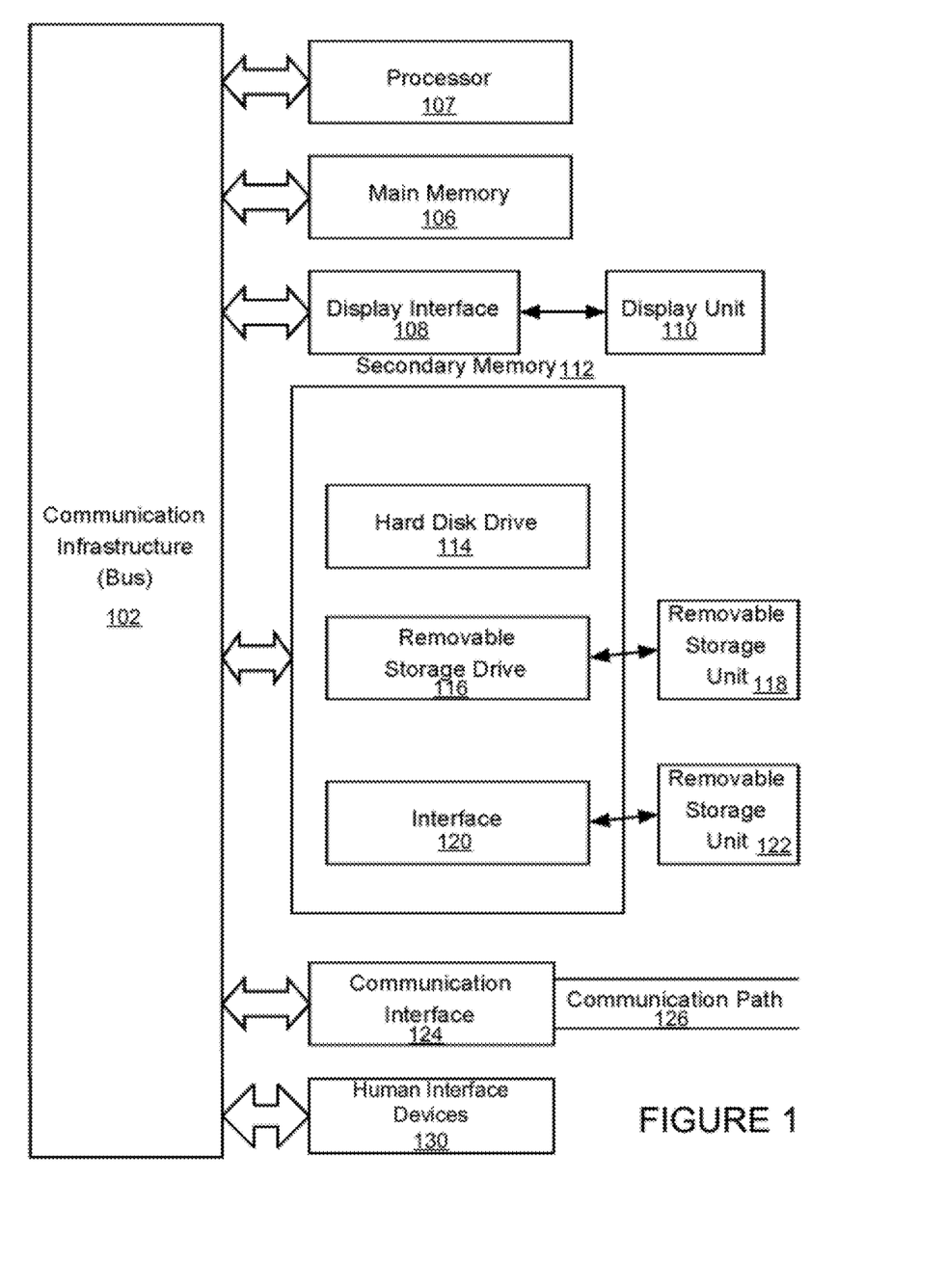
FIG. 1 illustrates an exemplary computer system on which the system and method of the invention may be practiced.

FIG. 1 is provided for purposes of illustrating a general-purpose computer and peripherals which, when programmed as described herein, may operate as a specially programmed computer capable of implementing one or more methods, apparatus and/or systems of the invention. Processor 107 may be coupled to a bi-directional communication infrastructure such as Communication Infrastructure System Bus 102. Communication Infrastructure 102 may generally be a system bus that provides an interface to the other components in the general-purpose computer system such as Processor 107, Main Memory 106, Display Interface 108, Secondary Memory 112 and/or Communication Interface 124.

Main memory 106 may provide a computer readable medium for accessing and executed stored data and applications. Display Interface 108 may communicate with Display Unit 110 that may be utilized to display outputs to the user of the specially-programmed computer system. Display Unit 110 may comprise one or more monitors that may visually depict aspects of the computer program to the user. Main Memory 106 and Display Interface 108 may be coupled to Communication Infrastructure 102, which may serve as the interface point to Secondary Memory 112 and Communication Interface 124. Secondary Memory 112 may provide additional memory resources beyond main Memory 106, and may generally function as a storage location for computer programs to be executed by Processor 107. Either fixed or removable computer-readable media may serve as Secondary Memory 112. Secondary Memory 112 may comprise, for example, Hard Disk 114 and Removable Storage Drive 116 that may have an associated Removable Storage Unit 118. There may be multiple sources of Secondary Memory 112 and systems of the invention may be configured as needed to support the data storage requirements of the user and the methods described herein. Secondary Memory 112 may also comprise Interface 120 that serves as an interface point to additional storage such as Removable Storage Unit 122. Numerous types of data storage devices may serve as repositories for data utilized by the specially programmed computer system of the invention. For example, magnetic, optical or magnetic-optical storage systems, or any other available mass storage technology that provides a repository for digital information may be used.

Communication Interface 124 may be coupled to Communication Infrastructure 102 and may serve as a conduit for data destined for or received from Communication Path 126. A Network Interface Card (NIC) is an example of the type of device that once coupled to Communication Infrastructure 102 may provide a mechanism for transporting data to Communication Path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system of the invention. Communication Path 126 may comprise any type of telecommunication network or interconnection fabric that can transport data to and from Communication Interface 124.

To facilitate user interaction with the specially programmed computer system of the invention, one or more Human Interface Devices (HID) 130 may be provided. Some examples of HIDs that enable users to input commands or data to the specially programmed computer of the invention may comprise a keyboard, mouse, touch screen devices, microphones or other audio interface devices, motion sensors or the like, as well as any other device able to accept any kind of human input and in turn communicate that input to Processor 107 to trigger one or more responses from the specially programmed computer of the invention are within the scope of the system of the invention.

While FIG. 1 depicts a physical device, the scope of the system of the invention may also encompass a virtual device, virtual machine or simulator embodied in one or more computer programs executing on a computer or computer system and acting or providing a computer system environment compatible with the methods and processes of the invention. Where a virtual machine, process, device or otherwise performs substantially similarly to that of a physical computer system of the invention, such a virtual platform will also fall within the scope of a system of the invention, notwithstanding the description herein of a physical system such as that in FIG. 1.

One or more embodiments of the invention are configured to enable the specially programmed computer of the invention to take the input data given and transform it into a source-independent server interface by applying one or more of the methods and/or processes of the invention as described herein. Thus the methods described herein are able to transform the raw input data, such as digital commands, to a source-independent server interface accepting origin-specific commands, using the system of the invention to result in an the server performing origin-specific commands arranged to preserve the independence of the, using the specially programmed computer as described herein. Particularly, the system of the invention may be programmed to acquire an object containing commands for execution and interpreting said commands in light of an origin-independent interface.

Figure 2:
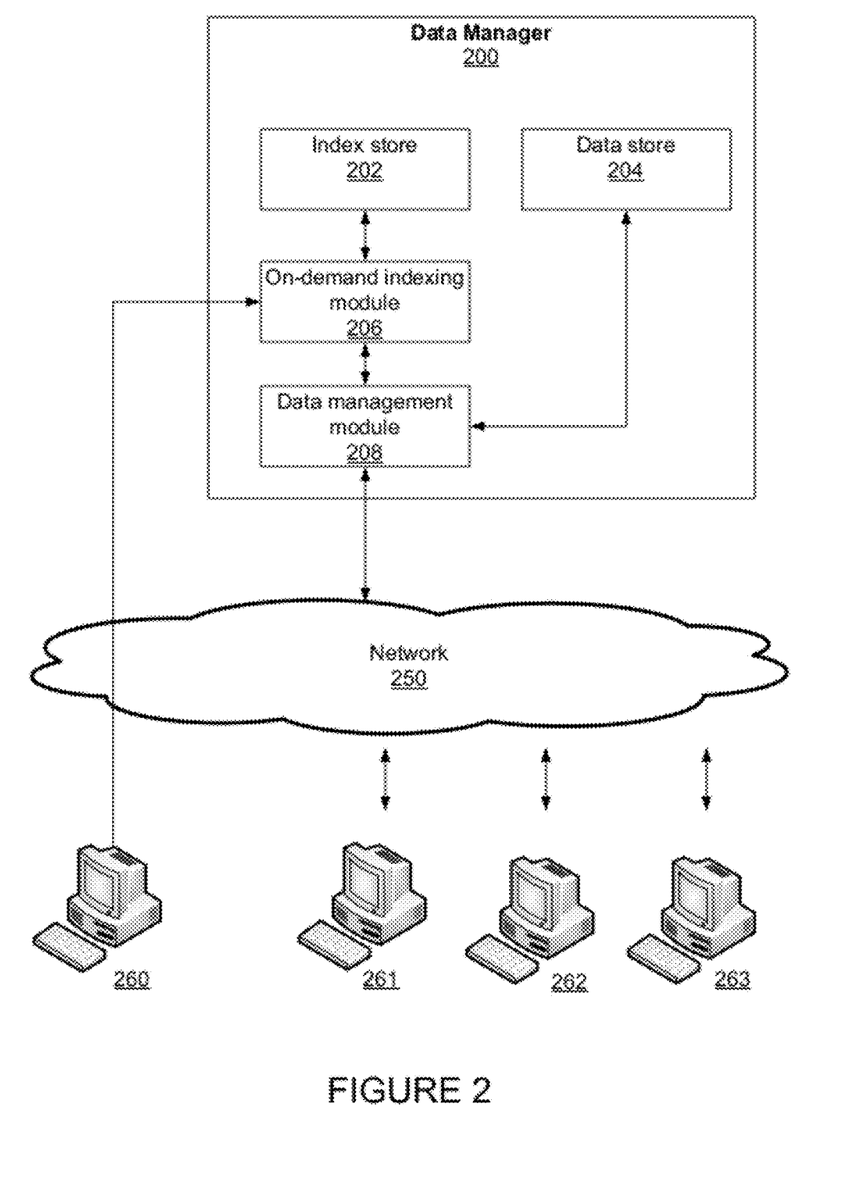
FIG. 2 is a block diagram of a data management system according to one embodiment of the invention.

FIG. 2 is a block diagram of a data management system configured in accordance with one or more embodiments of the invention. Data manager 200 stores, maintains and handles requests to access data records. In one or more embodiment of the invention, data manager 200 includes the functionality of a traditional database management system (DBMS), such as a relational database management system (RDBMS). Data manager 200 may be implemented on one server system. In another embodiment of the invention, components of Data manager 200 are implemented over multiple computer systems.

Data manager 200 includes data store 204 and index store 202. Data store 204 and index store 202 may reside on the same or different memory devices, such as magnetic, optical or magnetic-optical storage systems, or any other available mass storage technology that provides a repository for digital information. Data store 204 serves as a repository of data records managed by data manager 200. Index store 202 serves as a repository of priority indexes used by data manager 200. Priority indexes are generated and loaded in memory, while other indexes are only generated on-demand when a task is initiated that requires those indexes. As used herein, the term "priority index" refers to any index identified in a priority configuration used to determine which indexes to generate and load. For example, a priority index may be directly specified in the priority configuration, or may be identified using a threshold parameter in the priority configuration. As used herein, the term "threshold priority index" refers to an index identified using a threshold parameter in a priority configuration. Data about an index, such as the frequency of access, is analyzed and compared to a threshold parameter to determine if the index is a threshold priority index. As used herein, the term "index" refers to any data structure usable to improve the speed of operations in a database table. In one or more embodiments of the invention, indexes include bit vectors as described in U.S. Pat. No. 6,879,976, which is hereby incorporated herein by reference in its entirety. Other types of indexes compatible with the one or more embodiments of the invention include, but are not limited to, sort indexes, keyword indexes, substring indexes and inheritance indexes.

Data manager 200 also includes on-demand indexing module 206. On-demand indexing module 206 manages indexes in index store 202, including generation, deletion, update, and any other modification of an index. On-demand indexing module 206 also provides requested indexes in response to a request for an index, such as a request generated by data management module 208. On-demand indexing module 206 may be implemented on the same or different computer system as index store 202 and data store 204. On-demand indexing module 206 communicates with configuration client 260. In accordance with one or more embodiments of the invention, on-demand indexing module 206 receives a priority configuration from configuration client 260. The priority configuration contains information used by on-demand indexing module 206 to determine priority indexes. Priority indexes are be generated and loaded to index store 202, while other indexes will be generated on-demand. In one or more embodiments of the invention, index store 202 resides in RAM, allowing fast access to priority indexes. Communications involving on-demand indexing module may take place over network 250. Network 250 may be a local area network, wide area network, wireless network, or any other network. Alternatively, communications may occur over a communication infrastructure 102.

Data manager 200 also includes data management module 208. Data management module 208 manages data in data store 204, including generation, deletion, update, and any other modification of any record in data store 204. Data management module 208 also provides requested data in response to a query. Data management module 208 may be implemented the same or different computer system as index store 202, data store 204 and on-demand indexing module 206. Data management module 208 may include or substantially perform the functions provided by a standard database management system (DBMS). Data management module 208 communicates with data clients 261-263. Data clients 261-263 include any program configured to request data managed by data manager 200. In particular, data clients 261-263 request data stored in data store 204 by sending a query to data management module 208. Data clients 261-263 may also send data management module 208 requests to create, delete, update or otherwise modify data in data store 204. Data management module 208 also communicates with on-demand indexing module 206. In particular, when data management module 208 needs to access an index in order to respond to queries from data clients 261-263, it sends a request for the index to on-demand indexing module 206. Communications involving data management module 208 may take place over network 250. Network 250 may be a local area network, wide area network, wireless network, or any other network. A data client may also reside on the same computer system as data manager 200, and communication may occur over a communication infrastructure 102.

Figure 3:
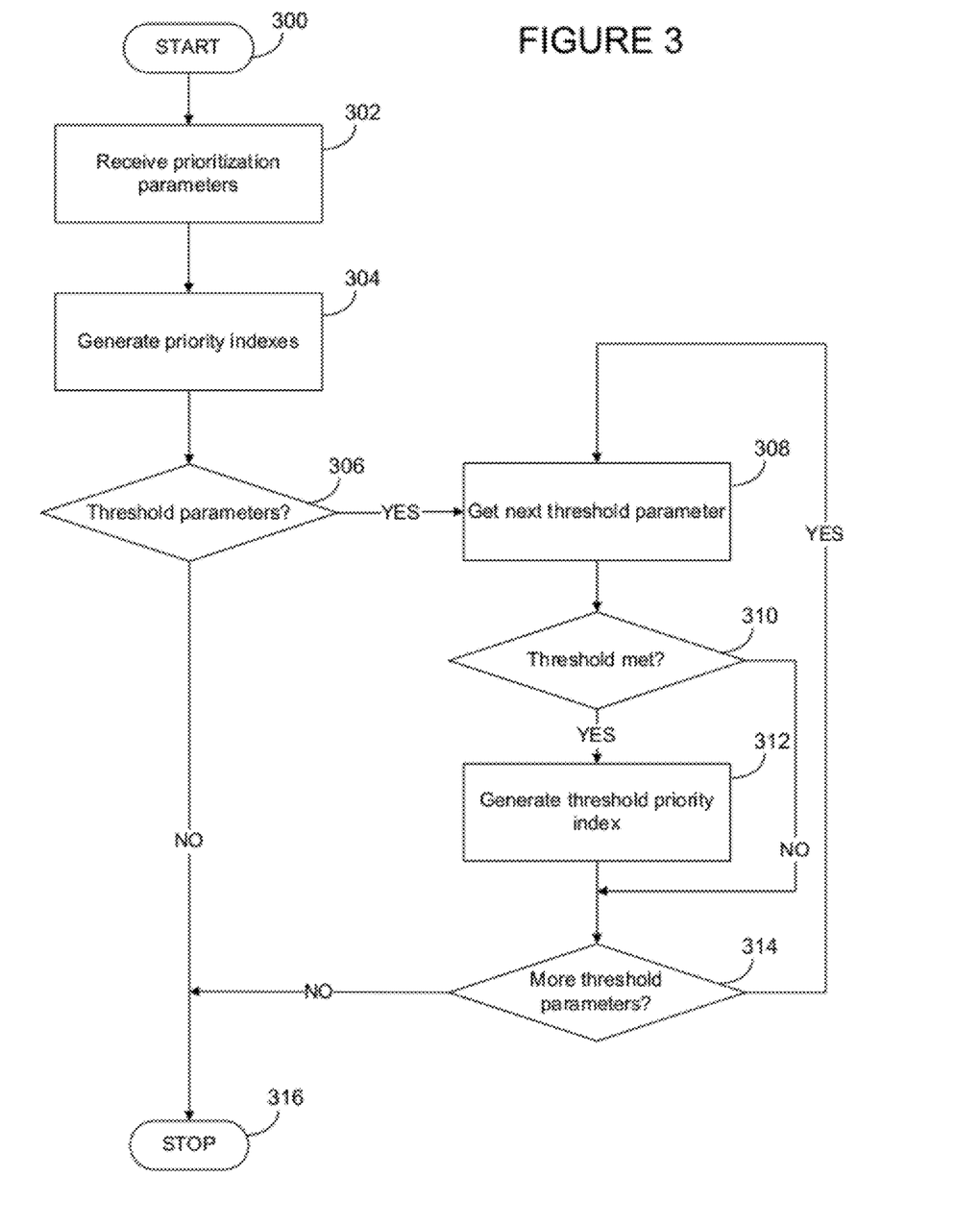
FIG. 3 provides a diagram of process steps to load priority indexes to memory one or more embodiments of the invention.

FIG. 3 provides a diagram of process steps to load priority indexes in accordance with one or more embodiments of the invention. The process begins at step 300. Processing continues to step 302, where a priority configuration is received. The priority configuration indicates which indexes to generate and load into memory. The priority configuration may indicate an index directly (priority indexes) or by a threshold parameter (threshold priority indexes). Possible threshold parameters include frequency of index usage, size of index, resources available on the system, or any other statistic or metadata related to the indexes, the data or the system. The priority configuration may be received as input from a user, such as in a user-defined file, through a graphical user interface (GUI), or through any other means of input by a user. In one or more embodiments of the invention, the priority configuration is generated by another computerized process, such as a process that analyzes the system, the data, or metadata.

Processing continues to step 304, where the directly indicated indexes, or priority indexes are generated. In one or more embodiments of the invention, no priority indexes are indicated in the priority configuration. In this case, no priority indexes are generated at step 304.

Processing continues to step 306, where a determination is made whether threshold parameters were present in the priority configuration. If no threshold parameters are included, processing continues to step 316 and terminates.

Otherwise, processing continues to step 308, where a threshold parameter is selected. Processing continues to step 310, where a determination is made whether an index meets the threshold defined by the threshold parameter. A threshold parameter may identify a parameter and a single index (e.g., Index=X, Param=size:Y indicates that index X should be generated if the size of the index is greater than Y). Alternatively, a threshold parameter may be applied to multiple indexes (e.g., Index=ALL, Param=dayfreq:100 indicates that any index should be generated that is accessed more than 100 times a day). In one or more embodiments of the invention, the priority configuration includes multiple threshold parameters that are applied to the same index to determine whether the index is a threshold priority index.

If an index meets the threshold defined by the threshold parameter, the index is considered a threshold priority index and is generated. Processing continues to step 314, where a determination is made whether there are more threshold parameters to process. If more threshold parameters exist, processing continues to step 308. Otherwise, processing continues to step 316 and terminates. It would be apparent to an artisan of ordinary skill that one or more embodiments of the invention may be practiced where a process continues to monitor an index associated with a threshold parameter, treating the index as a threshold priority index if the threshold becomes satisfied. One example of such an embodiment of the invention is described in FIG. 4.

Figure 4:
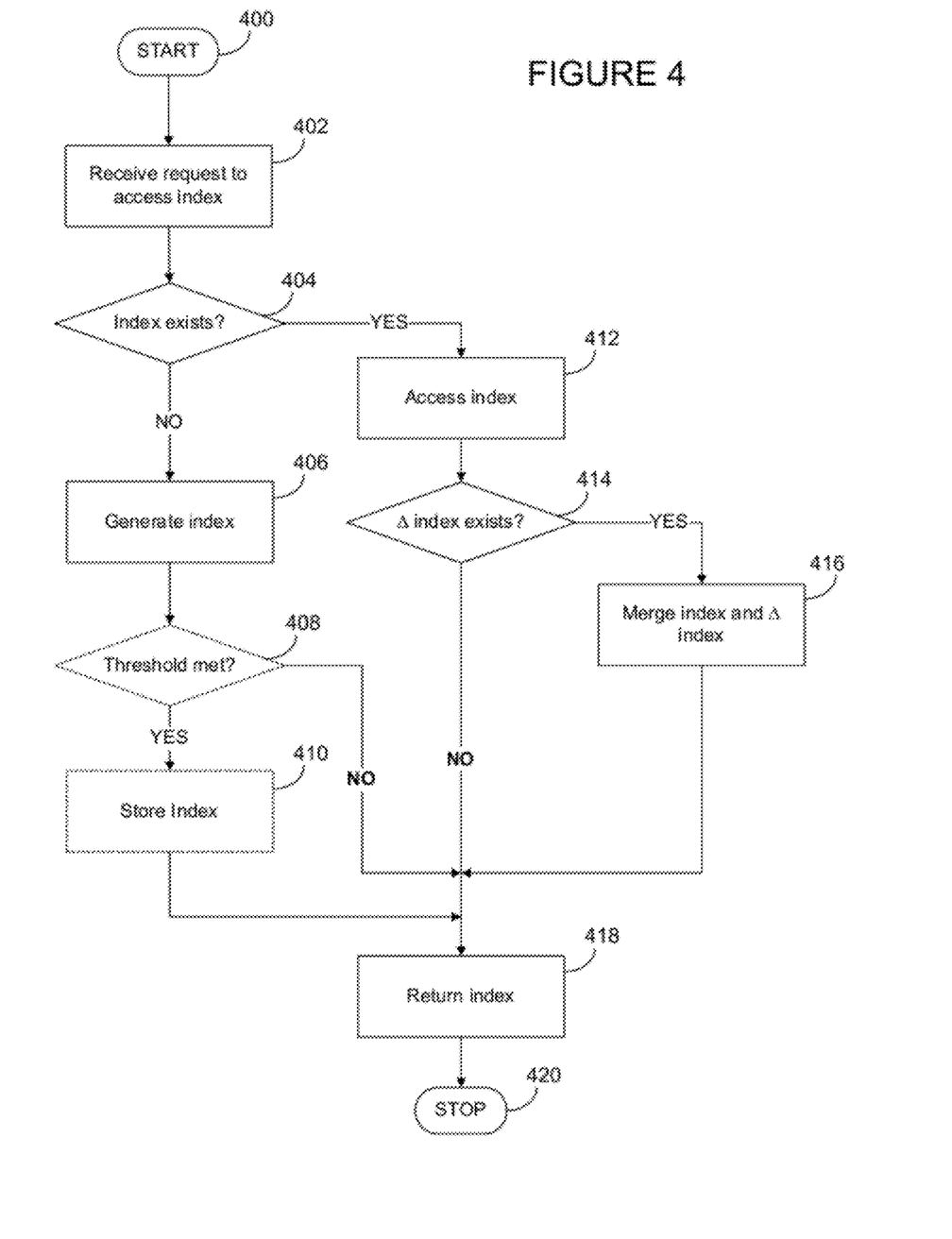
FIG. 4 provides a diagram of process steps to generate indexes on demand in one or more embodiments of the invention.

FIG. 4 provides a diagram of process steps to generate indexes on demand in one or more embodiments of the invention. In on-demand generation, an index is generated in response to a request to access the index when the index is not loaded in memory, i.e. the index is not a priority index. The process begins at step 400. Processing continues to step 402, where a request to access an index is received. Processing continues to step 404, where a determination is made whether the index is a priority index. If the index is a priority index, processing continues to step 412. Otherwise, processing continues to step 406.

At step 406, the index is generated. At optional step 408, a determination is made whether a threshold defined by a threshold parameter has been met for the index. This determination may be made each time the index is requested, or at any other frequency. The priority configuration may specify a frequency for checking whether a threshold has been met. If no threshold has been met, processing continues directly to step 418. If a threshold has been met, processing continues to step 410, where the index is identified as a priority index and stored and maintained with the priority indexes. Processing continues to step 418.

Returning step 412, the index is accessed from memory. Processing continues to step 414, where a determination is made whether a Δ index is associated with the priority index. If a Δ index is present, processing continues to step 416, where the Δ index is merged with the priority index, updating the priority index to create a current version of the priority index that reflects the changes recorded in the Δ index. Processing continues to step 418. If no threshold has been met, processing continues directly to step 418.

At step 418, the index is provided in response to the request to access the index. Processing continues to step 420 and terminates.

Figure 5:
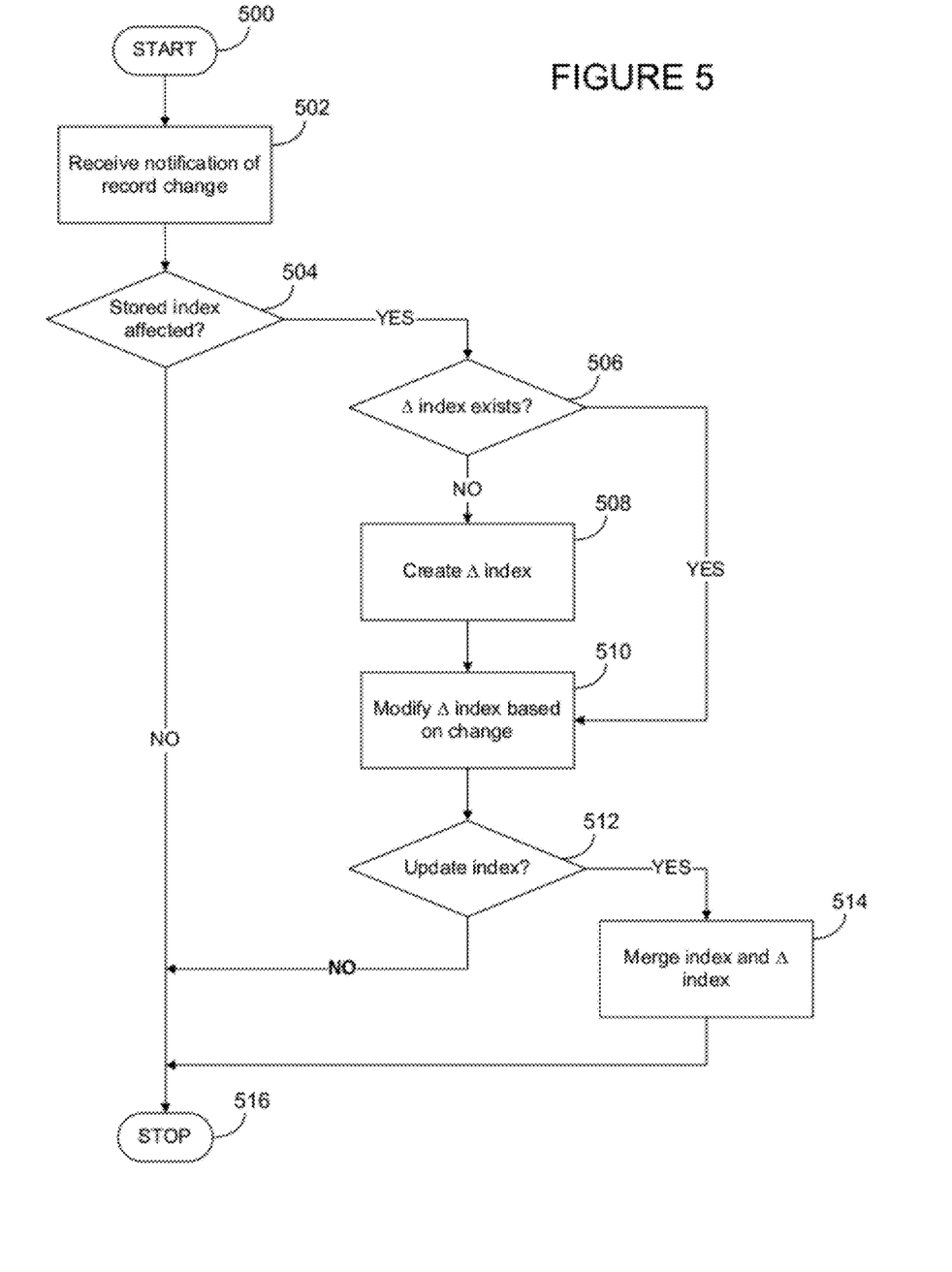
FIG. 5 provides a diagram of process steps to maintain priority indexes in one or more embodiments of the invention.

FIG. 5 provides a diagram of process steps to maintain priority indexes in accordance with one or more embodiments of the invention. The process begins at step 500. Processing continues to step 502, where a notification of a record change is received. Processing continues to step 504, where a determination is made whether a stored priority index is affected. In another embodiment of the invention, notifications are only received when record changes affect stored priority indexes. If a stored priority index is affected, processing continues to step 506. Otherwise, processing continues to step 516 and terminates.

Returning to step 506, a determination is made whether a Δ index is associated with the affected priority index. If a Δ index is associated with the affected priority index, processing continues to step 510. Otherwise, processing continues to step 508, where a Δ index is created. Processing continues to step 510.

At step 510, an entry is added to the Δ index to keep track of the record change. Entries in the Δ index may simply identify changed records. In this case, the changed records must be accessed to update the stored priority index when a current version of the priority index is required. Alternatively, the Δ index may contain enough data to update a stored priority index without accessing the changed records.

Processing continues to step 512, where a determination is made whether to update the priority index in memory. This determination may be made after each record change, or at another specified frequency. The priority configuration may specify a frequency, if at all, for updating an index after a record change affecting the index. If it is determined that the index should be updated, processing continues to step 514, where the priority index is merged with the Δ index and the stored priority index is updated. Processing continues to step 516 and terminates.

While the invention herein disclosed has been described by means of specific embodiments and applications thereof, numerous modifications and variations could be made thereto by those skilled in the art without departing from the scope of the invention set forth in the claims.

What is claimed is:

1. A method of on-demand generation of an index of records in a data management system comprising:
    receiving a priority configuration including information identifying at least one priority index associated with records in said data management system;
    generating said at least one priority index prior to receiving any request for the priority index, and loading said at least one priority index in said memory;
    receiving a request for a first index;
    determining whether said first index is currently loaded in memory, wherein at least some indexes are currently loaded in memory and other potential indexes are not currently loaded in memory;
    retrieving said first index from said memory when said first index is currently loaded in said memory;
    generating said first index by accessing said records when said first index is not currently loaded in said memory;
    retrieving a Δ index associated with said first index, wherein said Δ index comprises at least one entry reflecting an addition or modification of a record affecting said first index;
    updating said first index using said Δ index to reflect changes identified by said at least one entry of said Δ index; and
    providing said first index.

2. The method of claim 1, further comprising:
    automatically identifying at least one threshold priority index using a threshold parameter;
    generating said at least one threshold priority index prior to receiving any request for the threshold priority index; and
    loading said at least one threshold priority index in said memory;
    wherein said priority configuration further includes said threshold parameter.

3. The method of claim 2, wherein said threshold parameter indicates a prior frequency of index use.

4. The method of claim 1, wherein said priority configuration is defined by a user via a graphical user interface.

5. The method of claim 1, further comprising:
    automatically generating said priority configuration based on a prior frequency of index use.

6. A non-transitory computer-readable medium storing instructions and data configured to perform an automated process when executed by a processor, said automated process comprising
    receiving a priority configuration including information identifying at least one priority index associated with records in a data management system;
    generating said at least one priority index prior to receiving any request for the priority index, and loading said at least one priority index in said memory;
    receiving a request for a first index;
    determining whether said first index is currently loaded in memory, wherein at least some indexes are currently loaded in memory and other potential indexes are not currently loaded in memory;
    retrieving said first index from said memory when said first index is currently loaded in said memory;
    generating said first index by accessing said records when said first index is not currently loaded in said memory;
    retrieving a Δ index associated with said first index, wherein said Δ index comprises at least one entry reflecting an addition or modification of a record affecting said first index;
    updating said first index using said Δ index to reflect changes identified by said at least one entry of said Δ index; and
    providing said first index.

7. The medium of claim 6, wherein said automated process further includes:
    using at least one threshold parameter to automatically identify any threshold priority indexes;
    generating said any threshold priority indexes prior to receiving any request for the threshold priority index; and
    loading said any threshold priority indexes in said memory,
    wherein said priority configuration further includes said at least one threshold parameter.

8. A computer system comprising:
    a computer;
    a non-transitory computer-readable medium coupled to said computer, said computer-readable medium storing instructions and data configured to perform an automated process when executed by said computer, said automated process comprising:
    receiving a priority configuration including information identifying at least one priority index;
    generating said at least one priority index prior to receiving any request for the priority index;
    loading said at least one priority index in memory;
    receiving a request for a first index;
    determining whether said first index is currently loaded in said memory, wherein at least some indexes are currently loaded in memory and other potential indexes are not currently loaded in memory;
    retrieving said first index from said memory when said first index is currently loaded in said memory;
    generating said first index by accessing said records when said first index is not currently loaded in said memory;
    retrieving a Δ index associated with said first index, wherein said Δ index comprises at least one entry reflecting an addition or modification of a record affecting said first index;

updating said first index using said Δ index to reflect changes identified by said at least one entry of said Δ index; and providing said first index.

9. The computer system of claim 8, wherein said automated process further comprises:

using at least one threshold parameter to automatically identify any threshold priority indexes;

generating said any threshold priority indexes prior to receiving any request for the threshold priority index; and loading said any threshold priority indexes in said memory, wherein said priority configuration further includes said at least one threshold parameter.

10. The computer system of claim 8, wherein said request for said first index is received from another process running on said computer system.

* * * * *